US011401044B2

(12) United States Patent
Deiler et al.

(10) Patent No.: US 11,401,044 B2
(45) Date of Patent: Aug. 2, 2022

(54) METHOD AND ASSISTANCE SYSTEM FOR DETECTING A DEGRADATION OF FLIGHT PERFORMANCE

(71) Applicant: DEUTSCHES ZENTRUM FÜR LUFT-UND RAUMFAHRT E.V., Cologne (DE)

(72) Inventors: Christoph Deiler, Braunschweig (DE); Nicolas Fezans, Braunschweig (DE)

(73) Assignee: Deutsches Zentrum fuer Luft- und Raumfahrt e.V., Cologne (DE)

( * ) Notice: Subject to any disclaimer, the term of this patent is extended or adjusted under 35 U.S.C. 154(b) by 738 days.

(21) Appl. No.: 16/313,087

(22) PCT Filed: Jun. 8, 2017

(86) PCT No.: PCT/EP2017/066007
§ 371 (c)(1),
(2) Date: Jan. 7, 2019

(87) PCT Pub. No.: WO2018/002148
PCT Pub. Date: Jan. 4, 2018

(65) Prior Publication Data
US 2019/0193866 A1 Jun. 27, 2019

(30) Foreign Application Priority Data
Jun. 29, 2016 (DE) .................... 10 2016 111 902.4

(51) Int. Cl.
*B64D 45/00* (2006.01)
*G05B 23/02* (2006.01)
*B64D 15/20* (2006.01)
*B64F 5/60* (2017.01)

(52) U.S. Cl.
CPC ............. *B64D 45/00* (2013.01); *B64D 15/20* (2013.01); *B64F 5/60* (2017.01); *G05B 23/0254* (2013.01); *B64D 2045/0085* (2013.01)

(58) Field of Classification Search
None
See application file for complete search history.

(56) References Cited

U.S. PATENT DOCUMENTS 5,484,121 A * 1/1996 Padawer ............... B64D 15/20
244/134 F
6,253,126 B1 * 6/2001 Palmer .................. B64D 15/20
701/4

(Continued)

OTHER PUBLICATIONS

Gingras et al: "Development and Implementation of a Model-Driven Envelope Protection System for In-Flight Ice Contamination", American Institute of Aeronautics and Astronautics, Aug. 2010.

*Primary Examiner* — Jonathan M Dager
(74) *Attorney, Agent, or Firm* — WCF IP

(57) ABSTRACT

The invention relates to a method and to a device for detecting a degradation of flight performance of an aircraft that is in flight, wherein current flight status data of the aircraft that is in flight are first determined. A flight performance index is then calculated on the basis thereof. Furthermore, on the basis thereof, a nominal flight performance reference index is determined by means of a flight performance model, wherein a degradation of flight performance can be inferred by comparing the two indices.

18 Claims, 2 Drawing Sheets

(56) References Cited

U.S. PATENT DOCUMENTS

| | | | | |
|---|---|---|---|---|
| 6,304,194 | B1* | 10/2001 | McKillip | B64D 15/20 340/963 |
| 6,819,265 | B2* | 11/2004 | Jamieson | G08B 19/02 340/962 |
| 7,175,136 | B2* | 2/2007 | Shah | B64D 15/20 244/134 F |
| 7,398,182 | B2* | 7/2008 | Petit | B64D 15/00 73/170.15 |
| 7,439,877 | B1* | 10/2008 | Jarvinen | B64D 15/20 340/581 |
| 7,580,777 | B2* | 8/2009 | Smith | B64D 15/14 322/39 |
| 7,784,739 | B2* | 8/2010 | Nichols | B64D 15/20 244/134 F |
| 8,115,646 | B2* | 2/2012 | Tanielian | G01W 1/02 340/632 |
| 8,265,805 | B2* | 9/2012 | Ma | B64D 15/22 340/963 |
| 8,521,341 | B2* | 8/2013 | Brotherton | G05D 1/0055 701/3 |
| 8,692,361 | B2 | 4/2014 | Mahler et al. | |
| 8,711,008 | B2* | 4/2014 | Cook | G01K 13/02 340/963 |
| 8,779,945 | B2* | 7/2014 | Flemming | G01C 23/005 340/963 |
| 8,907,798 | B2* | 12/2014 | Meis | B64D 15/20 219/202 |
| 9,013,332 | B2* | 4/2015 | Meis | B64D 15/20 244/134 R |
| 9,116,243 | B1* | 8/2015 | Brown | G01S 17/18 701/14 |
| 9,133,773 | B2* | 9/2015 | Gould | F02C 7/047 |
| 9,180,972 | B2* | 11/2015 | Meis | B64D 15/20 |
| 9,302,777 | B2* | 4/2016 | Rennó | B64D 15/20 |
| 9,409,649 | B2* | 8/2016 | Greene | B64D 15/20 |
| 9,546,004 | B1* | 1/2017 | Safai | B64D 13/06 |
| 9,580,181 | B2* | 2/2017 | Figueroa-Karlstroem | B64D 15/163 |
| 9,656,757 | B2* | 5/2017 | Henze | B64D 15/12 |
| 9,683,489 | B2* | 6/2017 | Dischinger | F02C 7/00 |
| 9,914,543 | B2* | 3/2018 | Meis | B64D 15/22 |
| 9,957,053 | B2* | 5/2018 | Almond | G05D 1/0816 |
| 10,023,305 | B2* | 7/2018 | Isom | B64C 27/006 |
| 10,336,465 | B2* | 7/2019 | Rennó | B64D 43/00 |
| 10,520,524 | B1* | 12/2019 | Griffin | G01P 5/16 |
| 10,521,981 | B2* | 12/2019 | Bult | G07C 5/0808 |
| 10,529,240 | B2* | 1/2020 | Whitlow | G08G 5/0052 |
| 10,737,793 | B2* | 8/2020 | Meis | B64D 15/22 |
| 10,908,132 | B2* | 2/2021 | Jha | G01N 29/12 |
| 10,940,952 | B2* | 3/2021 | Inkpen | B64D 15/12 |
| 2004/0155151 | A1* | 8/2004 | Szilder | B64D 15/20 244/134 F |
| 2004/0206854 | A1* | 10/2004 | Shah | B64D 15/20 244/144 |
| 2005/0276696 | A1* | 12/2005 | LeMieux | F03D 80/40 416/61 |
| 2005/0288895 | A1* | 12/2005 | Petit | B64D 15/20 702/182 |
| 2008/0257033 | A1* | 10/2008 | Roberts | B64D 15/20 340/581 |
| 2012/0029786 | A1* | 2/2012 | Calandra | G01K 1/20 701/100 |
| 2012/0060505 | A1* | 3/2012 | Fuller | G05B 13/00 60/773 |
| 2013/0177417 | A1* | 7/2013 | Olesen | F03D 80/40 416/61 |
| 2014/0037446 | A1* | 2/2014 | Garnett | B64D 15/14 416/1 |
| 2014/0090456 | A1* | 4/2014 | Meisner | G01M 15/14 73/112.01 |
| 2016/0035203 | A1* | 2/2016 | Rossotto | G08B 19/02 701/36 |
| 2016/0052634 | A1* | 2/2016 | Almond | G05D 1/0816 701/14 |
| 2017/0243495 | A1* | 8/2017 | Moravek | G08G 5/0091 |
| 2019/0193866 | A1* | 6/2019 | Deiler | B64F 5/60 |
| 2019/0202568 | A1* | 7/2019 | Borup | B64C 39/024 |
| 2019/0291884 | A1* | 9/2019 | Mackin | B64D 47/08 |
| 2020/0026307 | A1* | 1/2020 | Lax | G05D 1/042 |

\* cited by examiner

METHOD AND ASSISTANCE SYSTEM FOR DETECTING A DEGRADATION OF FLIGHT PERFORMANCE

The invention relates to a method and a device for detecting a degradation of flight performance, in particular aircraft icing, of an aircraft that is in flight.

Aircraft have aerodynamic surfaces, which are subjected to the flow of air flowing around them at speed and thereby produce a lift, allowing the aircraft to fly within atmospheric air masses. However, depending on the flight situation, such aerodynamic surfaces may be susceptible to icing, whereby a layer of ice (partially or fully) forms on the outer flow surface around which the surrounding air masses flow, and these layers of ice can change the aerodynamic properties of the aerodynamic surface and consequently have an adverse effect on the overall flying state. Instances of icing on the fuselage or other surfaces that are not primarily necessary for producing a lift may however also have adverse effects on the flying characteristics of the aircraft, which can quickly lead to critical situations, especially in the takeoff and landing phases.

Detecting changes of the flight performance, in particular degradations of the flight performance generally and instances of icing specifically during the flight, is not at all a trivial matter here. Manual inspection of the aerodynamic surfaces, for example to check for icing, is not possible in flight, if only because access to the aerodynamic surfaces of the flight by on-board personnel is ruled out. Other systems, based on sensory detection of the icing, in some cases have a high degree of complexity and technical susceptibility, which not least results in a high instance of false alarms and consequently low acceptance on the part of pilots.

U.S. Pat. No. 6,253,126 B1 discloses a method and a device for flight monitoring, wherein a row of additional air pressure probes are arranged on the aircraft, in particular on the wings of the aircraft, in order to infer important flight parameters from a monitoring of the pressure distribution over the wing profile that is as complete as possible. It is additionally intended also to be possible with the aid of these sensors that an icing state can be detected.

However, it is disadvantageous here that no comprehensive concept is provided, so that for example detection of icing between the sensors is not recognized or just partial icing at one of the sensors is detected as icing. In the first case, icing is not recognized, which can overall have an adverse effect on the flying characteristics and as a result increase the potential risk of accident. In the second case, icing is indeed detected, whereupon under some circumstances countermeasures are taken by the pilot, even though the icing does not represent an impairment of the flying characteristics of any relevance to safety. In such a case, the countermeasures taken, such as for example changing the flight path, would then lead to higher costs and longer flying times, even though there was no necessity for this. In addition, the method proposed in U.S. Pat. No. 6,253,126 B1 is very laborious to develop, install and maintain. Furthermore, such a device would be very heavy (equipment, power supply, data communication with the computing unit intended to carry out the not-trivial evaluation), which with very great probability would lead to increased fuel consumption.

U.S. Pat. No. 8,692,361 B2 discloses a method for monitoring the quality of the flow on aerodynamic surfaces of aircraft, the main characteristic of the monitored flow being the laminarity. For this purpose, the aerodynamic surface is heated, so that an early transition from the laminar surrounding flow to a turbulent surrounding flow is enforced. On the basis of resistance data recorded with laminar surrounding flow and turbulent surrounding flow, a contamination of the aerodynamic surface can then be established.

It is disadvantageous here that a sophisticated heating system and a complex sensor system are necessary to be able to establish the correspondingly negative influencing effects on the aerodynamic surface. An icing or contamination of the aerodynamic surfaces that impairs the flying characteristics cannot be dependably established in this way, because this method only allows an evaluable measurement of the aerodynamic quality of the surface between a "perfectly clean" state and a "slightly contaminated" or "slightly iced" state. With further degradation of the aerodynamic quality of the surface, it is no longer possible in the case of the method described in U.S. Pat. No. 8,692,361 B2 to establish a difference. The degradation, which under some circumstances could become critical in terms of safety (for example in the case of heavy icing), is beyond the range for which the method described can be used.

Therefore, the object of the present invention is to provide an improved method and an improved device for detecting a degradation of flight performance, in particular aircraft icing of aerodynamic surfaces of an aircraft in flight, while intending to do without additional sensors that are not provided in standard flight operation and while intending not to need any further technical devices for influencing flow characteristics.

According to the invention, the object is achieved according to the invention by the method for detecting in-flight icing as claimed in claim 1 and also an assistance system for carrying out the method as claimed in claim 17.

According to claim 1, a method for detecting a degradation of flight performance of an aircraft in flight is proposed, first providing for the aircraft type concerned a digital flight performance model, of the aircraft in flight, which replicates the nominal flight performance of the aircraft in the non-degraded flying state.

Flight performance is a term used for a subdiscipline of flight mechanics that considers all aspects of the capability of an aircraft for carrying out a required flight maneuver. The flight performance of an aircraft in this case comprises indications concerning for example the maximum achievable speed, the minimum speed at which the aircraft remains controllable, the optimum cruising flight speed (lowest fuel consumption per unit of time and distance covered, the maximum climbing capacity and also the greatest rate of descent, the range, the longest flying time, etc.) and also all interrelationships between parameters and variables involved during a steady-state or quasi steady-state flying state, which is not necessarily restricted to a steady state of flying horizontally straight ahead. The flight performance of an aircraft is substantially determined by its aerodynamic properties on the one hand and the (available) thrust of the engines on the other hand, and generally represents a combination of the two components.

The nominal flight performance refers in this case to the corresponding capabilities and characteristics of the aircraft to carry out the flight maneuver in the non-degraded state. Thus, for example, what speed an aircraft will assume when the other boundary conditions of the flying state, such as for example the barometric height, the engine thrust, the mass and also aerodynamic properties of the aircraft are known, can be derived from flight performance models. In this case, the term flight performance per se should not even be equated with the physical definition of performance (energy per unit of time), but rather it comprises in the broadest sense the capability of an aircraft to carry out the flight maneuver under predetermined boundary conditions of the flying state.

Flight performance models in various forms and representations are used in flight operation and also in the aircraft design phase. For example, pilots use flight performance models for determining the amount of fuel necessary for a flight, for example directly by using a numerical flight performance model or by means of a suitable representation of items of information that can be extracted therefrom (for example in the form of tables, nomograms or charts).

In the broadest sense, it is therefore possible with knowledge of a number of boundary conditions of a flying state to derive from the flight performance model whether or not, with the predetermined boundary conditions, the flight maneuver can be carried out. Depending on the flight performance model, it is also possible to derive or extract further data of the flying state that are not known from the current flying state or cannot yet be known.

Such a flight performance model may in this case be based on a numerical calculation, with which the unknown parameter to be extracted from the flight performance model can be calculated on the basis of the known boundary conditions of the flying state. Also conceivable, however, is a tabular form, such as for example look-up tables.

According to the invention, such a flight performance model is thus provided in a digital form for the aircraft type concerned, of the aircraft in flight, allowing the nominal flight performance of the aircraft in the non-degraded or uniced flying state to be derived from it.

During the flight, the current flying state of the aircraft in flight is then determined, the current flying state being determined from a plurality of values, comprising flying state parameters that influence or characterize the flight performance of the aircraft. In the context of the present invention, the current flying state is an n-tuple of a plurality of different flying state parameters which in their entirety ultimately define the current flying state. Such flying state parameters may for example be the altitude, the speed with respect to the surrounding air, the mass and also parameters that can be derived therefrom. The flying state parameters may for example be parameters that can be recorded by sensors, which may for example be the barometric height or the flying speed with respect to the surrounding air. They may, however, also be parameters that can be input manually by the pilot, such as for example the estimated overall mass of the aircraft. In addition, the flying state parameters may also be parameters that can be derived from other flying state parameters, such as for example characteristics for the lift or characteristics for the resistance coefficient.

The flying state parameters that can be recorded by sensors are in this case exclusively those parameters that can be recorded and detected with the aid of on-board sensors. As also shown later, there is no need for any further, additional sensors that are not generally provided in the standard equipment of the aircraft type concerned.

With the aid of an electronic evaluation unit, the values of one or more flying state parameters of the current flying state are then used to calculate during the flight a current flight performance indicator, which represents an assessment of the flight performance at the current point in time with reference to the current flying state of the aircraft in flight. As also shown later, such a current flight performance indicator may for example be the overall energy $E$ or the overall change in energy $\dot{E}$ over a certain time period. Also conceivable, however, are other indicators that allow inference of the flight performance with reference to the current flying state and indicate a variation in the flight performance, in particular with reference to degradation or icing.

Furthermore, a nominal flight performance reference indicator is calculated by means of the electronic evaluation unit from the flight performance model provided, in dependence on the values of one or more flying state parameters of the currently determined flying state, the nominal flight performance reference indicator replicating with reference to the degradation or specifically the icing of the aircraft the ideal, non-degraded flying state. The flight performance reference indicator may in this case likewise be the nominal overall energy $E_{Ref}$ or overall change in energy $\dot{E}_{Ref}$ and is preferably such that it is correlated with the current flight performance indicator or quantitatively comparable.

Subsequently, the current flight performance indicator is compared with the nominal flight performance reference indicator, a flight performance degradation of the aircraft in flight being detected if the comparison indicates a deviation between the current flight performance indicator and the nominal flight performance reference indicator that is greater than a predetermined limit value or threshold value.

It is consequently possible during the flight of the aircraft to detect a degradation of the flight performance, in particular that is critical in terms of safety, exclusively on the basis of the available sensor values of sensors fitted as standard, without the need for special, fault-susceptible additional systems and without special flight maneuvers having to be carried out for this. A degradation is assumed to be critical in terms of safety if it has significant noticeable effects on the aircraft. For example, as from a certain degree of degradation, the nominal maximum climbing rate of the aircraft can no longer be achieved, whereby under some circumstances rapid evasive action or aborted landing is no longer possible. Furthermore, a degradation may also be regarded as extremely critical in terms of safety if flow separation already occurs in the flying ranges in which the aircraft would nominally be flyable without restriction.

A special form of the flight performance degradation in this case is the flight performance degradation caused by icing. The inventors have recognized here that, by considering the flight performance, reduced to an indicator, during the flight and by establishing a deviation of the current flight performance from a nominal flight performance, likewise reduced to an indicator, icing, in particular icing that is critical in terms of safety, can be dependably recognized. The reason for this is that the icing of aerodynamic surfaces of the aircraft or other surfaces that are flowed around has the effect that the resistance of the aircraft increases, which is ultimately reflected in a changed flight performance, and consequently a changed flight performance indicator. It has also been recognized in this respect that, even with a small increase in the resistance, such an indicator is very informative, in warning of icing that is critical in terms of safety.

It is significant here that it has been recognized that the variation of the flight performance of an aircraft type within the overall aircraft fleet always lies below the deviation of the flight performance arising due to icing of an aircraft, so that, by considering the current flight performance with reference to a nominal flight performance of the respective aircraft type, dependable detection of icing can nevertheless be realized in spite of inherent variations of the flight performance among the individual aircraft of the aircraft fleet. It has also been recognized in this case that every flight performance degradation that is critical in terms of safety is always greater than the variation of the flight performance that is inherent in the overall flight fleet. Thus, a degradation of flight performance that is critical in terms of safety can be distinguished from the natural variation of the flight performance within the overall aircraft fleet.

In particular, engine characteristics, which, as flying state parameters, have a not inconsiderable effect on the current flight performance, can lead to a variation of the flight performance with respect to a referencing of the flight performance in the non-degraded state which may for example be attributable to the aging of the engines, cleanliness of the engines and maintenance intervals. It has in this respect been recognized that such variations of the flight performance that relate to variations of the engine performance, in particular the thrust performance of the engines, likewise lie below the variation of the flight performance caused by a degradation, so that a degradation can also be dependably detected independently of the fluctuation in engine performance to be expected during operation.

The method according to the invention is additionally capable of being appropriately adapted to every aircraft type of an aircraft fleet altogether or individually to each individual aircraft, in that the flight performance model provided replicates the nominal flight performance of the aircraft in the non-degraded flying state for at least each aircraft type of the aircraft fleet or individually for the respective aircraft.

Causes of a flight performance degradation may be, inter alia, icing of the aircraft, contamination at least of part of the aircraft, contamination of the engines (for example by sand, volcanic ash, deposits on the engine rotor blades), abrasion within the engines or aircraft hull, damage to the aircraft hull or the engines, for example caused by collisions with objects (hail, bird strike, other aircraft, vehicles, buildings, projectiles) and also additional interfering objects, such as for example opened parachutes when a load is shed, presence of external equipment (that is not nominally taken into account).

Advantageously determined as flying state parameters are the current flying speed, the current altitude, the current overall aircraft mass and also a change over time of these flying state parameters, i.e. a change over time of the current flying speed, a change over time of the current flying altitude and also a change over time of the overall aircraft mass. Also determinable as flying state parameters are an engine characteristic for determining the engine performance, a load factor in at least the Z axis (vertical axis), a load factor in the direction of the two other axes (longitudinal axis, transverse axis), a current lift characteristic of the aircraft, the current dynamic pressure and also an aircraft configuration as flying state parameters.

In order to avoid atmospherically induced instances of false detection, it is advantageous if a quasi steady state of the atmosphere is assumed. This means that first a suitable approach, such as for example the Kalman filters widely adopted in science and technology, is used for determining the current wind in an earth-based system of coordinates, whereby the resultant items of information are available for further use within the flight performance determination. It has in this respect been recognized that the change over time of the current flight performance can be divided into two fundamental parts, to be specific on the one hand a component that results from the change in the path speed during a flight due to a non-variable wind field and on the other hand a component that results from the aircraft experiencing a change of wind. The latter is caused for example by the wind field changing locally or over time, whereby the velocity of the incoming flow is influenced. It has been recognized by the inventors that only the first component of the change in speed correlates with the flight performance and is consequently relevant to an improved detection.

With the aid of these flying state parameters that can be determined with the aid of sensors located as standard on board an aircraft, icing of an aircraft in flight can be dependably recognized. In this case, the current flying speed and also the current altitude (barometric height) and the dynamic pressure can be determined with the aid of sensors that are always present as standard, in particular in the case of airliners or commercial aircraft. Further, additional sensors, which would have to be especially fitted for detection of icing, are not necessary. A change over time of the current flying speed and also a change over time of the current flying altitude can in this case be correspondingly derived from the values originating from the sensors over a predetermined time period. The current overall aircraft mass for example can be determined sufficiently accurately from the input by the pilot before takeoff and also the fuel consumption during the flight. Furthermore, depending on the aircraft type, the current overall mass is also estimated during the flight by on-board avionic systems. A change in the overall aircraft mass, which takes place due to the continuous consumption of fuel during the flight, can be derived directly from the fuel consumption (sensors in the fuel supply lines). Engine characteristics for determining the engine performance are provided during the flight by each engine to the on-board electronics of an aircraft, and consequently can likewise be continuously accessed. The same applies to the load factors, the values of which are obtained from the inertial navigation system of the aircraft. The determination of the lift parameter can in this case be derived computationally from the corresponding measured values and measured parameters.

In the context of the present invention, an aircraft configuration is a term used for the current configuration of the aircraft with regard to the configurations influencing the aerodynamics, such as for example the state of the extended landing gear, the position of the landing flaps or slats or other lift-increasing devices. This is so because the change of the aircraft configuration during the flight, for example during landing, where the high-lift devices are continuously extended, has the effect that the aerodynamically dependent resistance of the aircraft changes, which has a direct influence on the flight performance. To avoid false detections, knowledge of the current aircraft configuration is therefore advantageous for determining the nominal flight performance, since the nominal flight performance depends on the respective aircraft configuration. In the context of the present invention, an aircraft configuration is also understood in particular as meaning the presence of optional devices that significantly influence the flight performance, and also possibly their own state. These devices may be for example measuring instruments, in-flight refueling devices (refueling pods under the wings) and also their current state (for example the position (opened or closed) of a loading ramp or whether an in-flight refueling hose is retracted or extended).

In an advantageous embodiment, the current lift characteristic of the aircraft is calculated as a flying state parameter according to the formula $$A \equiv (n_z)^a \cdot g \cdot m$$

In this case, A is the lift characteristic, $(n_z)^a$ is a load factor in the lift axis of the aircraft, g is the acceleration due to gravity and m is the overall aircraft mass.

The load factor $(n_z)^a$ in the lift axis of the aircraft can in this case be calculated according to the formula $$(n_z)^a = -(n_x)^f \cdot \sin(\alpha) + (n_z)^f \cdot \cos(\alpha)$$

where $(n_x)^f$ is the load factor in the longitudinal axis of the aircraft, $(n_z)^f$ is the load factor in the vertical axis of the aircraft and a is the angle of attack (angle of attack in the plane of symmetry of the aircraft between the direction of incoming flow and the longitudinal axis of the aircraft).

Advantageously, the engine characteristic is set in relation to all of the engines of the aircraft, for example in the form of an overall engine characteristic or an engine characteristic equivalent thereto. In the case of multi-engine aircraft, for example an averaged engine characteristic, taken over all the engine characteristics of all the engines, can be calculated.

In a further advantageous embodiment, the low-pressure shaft speed of at least one engine of the aircraft, advantageously all of the engines (for example as an averaged characteristic), is determined for the engine characteristic for determining the engine performance as a flying state parameter. The low-pressure shaft speed of an engine is therefore particularly well suited in this case as an engine characteristic because it correlates very well with the engine performance, in particular with the engine thrust. This is so because the determination of the engine performance or the engine thrust during the flight is only possible by approximation, using complicated methods. The inventors have recognized in this respect that, with the aid of the low-pressure shaft speed as an engine characteristic, it is also possible to infer approximately the engine performance, which influences flight performance and is sufficient for the detection of a significant change in flight performance or an icing state. Calculation methods for determining the engine performance that are complex and susceptible to errors and, in addition, also computationally intensive are not necessary in principle for the present method.

This has the decisive advantage that the present method for recognizing icing can be performed by means of the on-board electronic data processing systems, because no excessive computing capacity is required and the calculations can also be carried out by the on-board avionic systems.

Some parameters that come into consideration for the method are mentioned below by way of example. For the altitude as a flying state parameter, the barometric height (with or partially with ISA assumptions), the geometric height, the geopotential height, the ellipsoidal height or the orthometric height come into consideration. Furthermore, the air density, the temperature and also the air pressure come into consideration as flying state parameters to be taken into account. For the thrust as a flying state parameter, the following come into consideration for example: thrust, PLA (power lever angle), EPR (engine pressure ratio), $N_1$ (fan speed, low pressure core speed, $N_2$ (low pressure core speed, high pressure core speed), $N_3$ (high pressure core speed), torque (possibly normalized), $N_P$ (propeller speed), $N_H$ (high pressure turbine rotational speed), $N_L$ (low pressure turbine rotational speed), FF (fuel flow), TT (turbine temperature), EGT (exhaust gas temperature), oil temperature, oil pressure, propeller pitch, propeller loads, fan loads, gear loads. For the speed as a flying state parameter, the following come into consideration for example: VIAS (indicated airspeed), VCAS (calibrated airspeed), VTAS (true airspeed), VEAS (equivalent airspeed), Ma (Mach number), Fr (Froude number), Re (Reynolds number). For the overall lift as a flying state parameter, the following come into consideration for example: lift (i.e. in the aerodynamic system), Z force (in the physically fixed system), load factor, profile pressure distribution over the span.

As already mentioned, it is most particularly advantageous if the current flight performance is an overall change in energy over a predetermined time period. The overall change in energy can in this case be determined from the current flying speed with respect to the air ($V_{TAS}$ true-airspeed), the current barometric flying altitude and also the overall aircraft mass and the changes thereof over time in each case. This allows the flight performance indicator and the associated representation of the current flight performance to be calculated by very simple means, without losing sight of the accuracy of the method of detection.

Thus, the current flight performance indicator can be calculated as an overall change in energy according to $$\dot{E}_{ov} \approx (g \cdot \dot{H} \cdot m) + (g \cdot H \cdot \dot{m}) + (V_{TAS} \cdot \dot{V}_{TAS} \cdot m) + (\tfrac{1}{2} \cdot V_{TAS}^2 \cdot \dot{m})$$

where $\dot{E}_{ov}$ is the overall change in energy over the predetermined time period, H is the current flying altitude, $\dot{H}$ is the change over time of the flying altitudes over the predetermined time period, $V_{TAS}$ is the current flying speed with respect to the air flowing around, $\dot{V}_{TAS}$ is the change over time of the flying speed with respect to the air flowing around over the predetermined time period, m is the current overall aircraft mass and $\dot{m}$ is the change over time of the overall aircraft mass over the predetermined time period and g is the acceleration due to gravity. Since the change over time of the acceleration due to gravity g is generally very small and its relevance to the change over time of the overall energy is very minor, the approximated form represented above can be used. Thus, for example, the usually positively defined fuel mass flow from the aircraft tanks to the engines can be entered as a negative change in mass $-\dot{m}$.

It should be mentioned once again at this point that the flight performance indicators can be determined as an overall change in energy without additional sensors, since the values of the specified flying state parameters that are required for calculating the overall change in energy are determined and provided continuously by the avionic systems of the aircraft, or can be derived from the determined values of various flying state parameters.

In an advantageous embodiment in this respect, the nominal flight performance reference indicator is likewise specified in the form of an overall change in energy, so that the nominal performance reference indicator is a nominal overall change in energy over a predetermined time period. The flight performance model is in this case formed such that the nominal overall change in energy for the current flying state can be derived on the basis of the current flying state and the corresponding values of the flying state parameters.

On account of the fact that the nominal overall change in energy for the current flying state can be derived by means of the flight performance model and, in addition, the overall energy is determined as a current flight performance indicator, the two indicators can be compared with one another and corresponding deviations can be established.

In an advantageous embodiment in this respect, a differential resistance coefficient is calculated in dependence on the current overall change in energy as a current flight performance indicator and the nominal overall change in energy as a nominal flight performance reference indicator according to the formula $$\Delta C_W = \frac{\dot{E}_{ref} - \dot{E}_{ov}}{q \cdot S \cdot V_{TAS}}$$

where $\dot{E}_{ov}$ is the current overall change in energy, $\dot{E}_{ref}$ is the nominal overall change in energy, $V_{TAS}$ is the speed of the aircraft with respect to the air, q is the dynamic pressure and S is the wing surface area of the aircraft. This characteristic value in the form of a differential resistance coefficient is obtained as a difference between the current flight performance and the reference flight performance, it being possible for example to assume icing of the aircraft, and a detection of aircraft icing occurring, if a predetermined limit value with respect to the differential resistance coefficient is exceeded.

The conversion as a dimensionless coefficient $\Delta C_W$ is particularly advantageous, because it is a very simple criterion (for example threshold value at 30% $C_{W0}$), which can be used independently of the flying state and the state of the aircraft and also independently of the aircraft itself. The necessary scaling between quite small aircraft and quite large aircraft, or from slow flying states to fast flying states, has already been taken into account in the terms that are used in the calculation of $\Delta C_W$.

In order also at this point to achieve a robustness with respect to external influences, it has been recognized that a filtering of the determined characteristic is advantageous, to compensate for highly dynamic and non-steady effects from for example the flight due to turbulences, which could briefly falsify the calculated current flight performance characteristic.

In a further advantageous embodiment, furthermore, values of flying state parameters from which a sideslip state can be determined are determined. In dependence on these determined values of flying state parameters from which a sideslip flying state can be determined, a compensation value of the current flight performance indicator is then calculated, so that the current flight performance indicator is corrected by the compensation value. This allows the sideslip flying state, which can falsify the calculation of the current flight performance indicator, to be removed from the overall change in energy, so that the risk of false detections during sideslip can be reduced or avoided.

The compensation value may in this case be a resistance compensation value, which can be calculated according to the formula $$\Delta C_{w,comp} \equiv \frac{n_y^f \cdot m \cdot g \cdot \sin\beta}{q \cdot S}$$

where $\Delta C_{W,comp}$ is the resistance compensation value, $n_y^f$ is a lateral, aircraft-fixed load factor, m is the overall aircraft mass, g is the acceleration due to gravity, $\beta$ is the sideslip angle, q is the dynamic pressure and S is the reference surface area of the aircraft. The sideslip angle may be estimated (on the basis of other data and information), measured and/or calculated.

In a further advantageous embodiment, a reduced flight performance model is provided in the form of a multidimensional table, each flying state parameter that is relevant to the flight performance model being replicated by a dimension of the table. Each dimension of the table has in this case a plurality of interpolation points for the respective flying state parameter, which replicate the predetermined values of the respective flying state parameters of this dimension of the table. For each pair of interpolation values comprising values of the various flying state parameters of the individual dimensions of the table, it is then possible to derive at least one nominal flight performance reference indicator, which is stored at this position of the table defined by the pair of interpolation points.

It has been found to be advantageous in this respect if the flying speed with respect to the air flowing around, a lift characteristic of the lift of the aircraft, an engine characteristic of the engine performance, the flying altitude and also possibly an aircraft configuration as flying state parameters respectively form a dimension of the table, so that the flight performance reference indicator can be determined, for example in the form of a nominal overall change in energy, on the basis of specific values of these flying state parameters.

The advantage of providing the flight performance model in this tabular form is that the desired flight performance reference indicator can be determined from the flight performance model without any appreciable computational effort (a small, constant number of computing operations), so that the overall detection of aircraft icing can be carried out continuously during the flight in real time. The pilot can therefore be provided with signalling about icing immediately. There is consequently no need to simulate a complete dynamic model that requires great computing power, which especially in the case of small unmanned flying objects cannot be provided.

The object is otherwise also achieved according to the invention by the assistance system according to claim 17 for carrying out the aforementioned method. The assistance system has in particular an electronic evaluation unit, in order to carry out the calculations of the current flight performance indicator and the nominal flight performance reference indicator and also the detection of icing by comparison of the two indicators. Furthermore, the assistance system has a data memory or is in communicative connection with such a memory, the digital flight performance model being stored in the data memory.

The invention is explained by way of example on the basis of the accompanying figures, in which.

Figure 1:
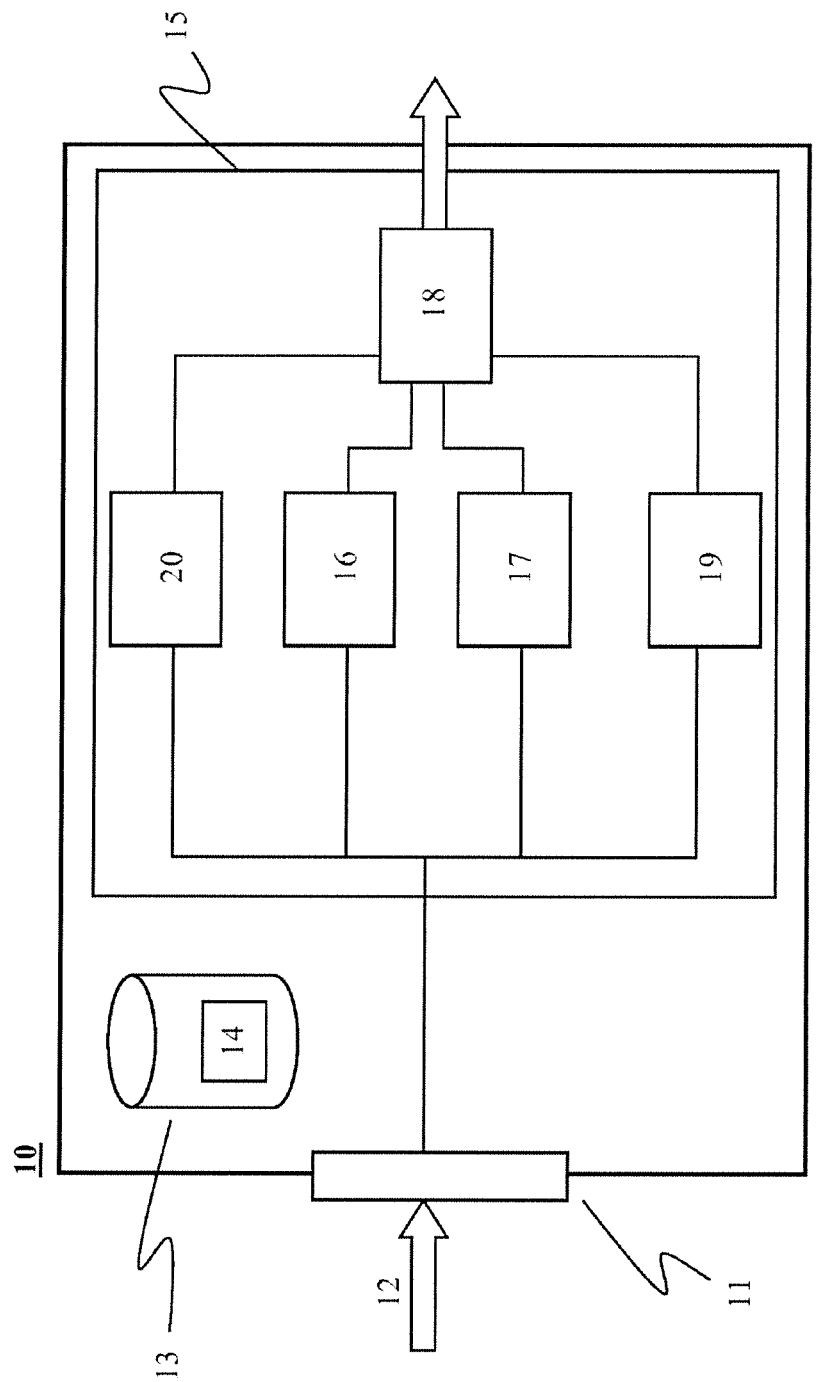
FIG. 1 shows a schematic representation of an assistance system.

FIG. 1 schematically shows the assistance system 10, which may for example be an electronic data processing system within the avionic systems of an aircraft. However, it is also conceivable that the assistance system 10 is provided outside the aircraft, a communicative connection between the assistance system on the one hand and the aircraft on the other hand then having to exist in order to be able to transmit the data of the flying state that are necessary for the calculation and the detection to the assistance system 10 and to transmit a possible detection of icing back again into the aircraft. Use as "post-flight analysis" is also conceivable.

In the further explanations, it is however assumed that the assistance system 10 is a component part of an aircraft.

The assistance system 10 is connected via an interface 11 to the data bus 12 of the avionic system of the aircraft, in order to be able to record the flying state parameters necessary for detection. By way of this data bus 12, the assistance system 10 is indirectly in connection with the sensors fitted as standard in the aircraft and can thus record the flying state parameters necessary for detection that are measured with the aid of the sensors during the flight and access them from the data bus 12 via the interface 11.

The assistance system 10 has furthermore a digital data memory 13, in which the flight performance model 14 is stored in the form of a multidimensional table. The multidimensional table has the advantage, however, that the determination of the flight performance reference indicator is possible without any special computing effort, since it is obtained directly from the table in dependence on the specific values of the flying state parameters of the flying state. In addition, there is the possibility of interpolating between flight performance reference indicators if the values of the flying state parameters of the flying state do not directly replicate the corresponding interpolation points.

Figure 2:
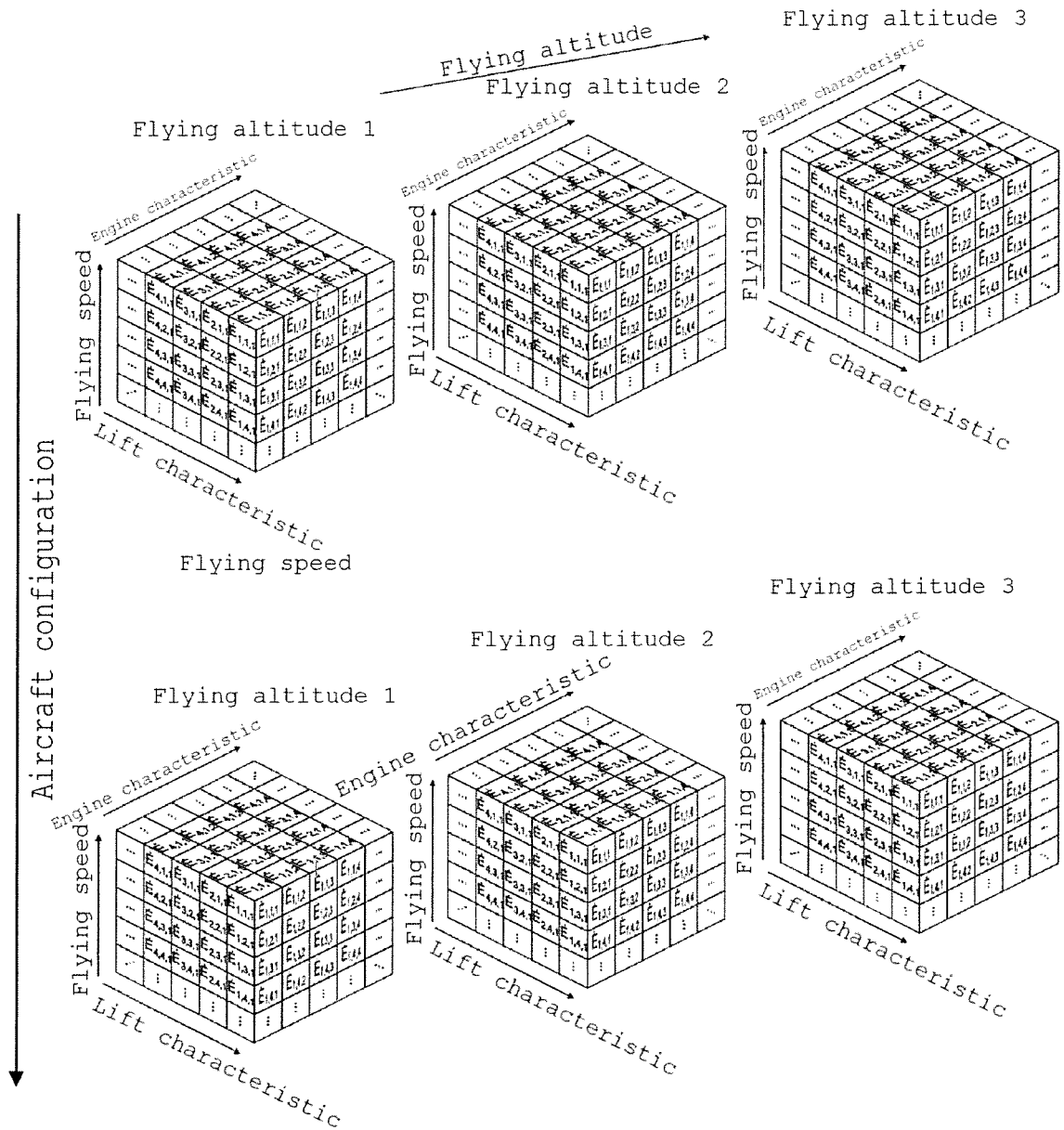
FIG. 2 shows a simplified representation of a tabular flight performance model.

As shown in FIG. 2, such a tabular representation of the digital flight performance model may for example consist of five dimensions, a dimension being respectively provided for the flying speed, a lift characteristic, an engine characteristic, the flying altitude, and also an overarching aircraft configuration.

Returning to FIG. 1, the assistance system 10 has furthermore an electronic evaluation unit 15, which is designed for detecting an icing state. For this, the evaluation unit 15 has a reference module 16, which is designed for calculating or determining a nominal flight performance reference indicator. In the exemplary embodiment of FIG. 1, the nominal flight performance reference indicator is the overall change in energy $\dot{E}_{ref}$, which is also stored in the table in the flight performance model according to FIG. 2.

The reference module 16 is in this case connected to the digital data memory 13, in which the flight performance model 14 is stored, in order to be able to access the table 14 stored there. Furthermore, the reference module 16 is connected in terms of signaling to the data bus 12 via the interface 11, in order to be able to determine the flying state parameters necessary for the calculation and determination of the overall change in energy $\dot{E}_{ref}$ and their current values.

In the exemplary embodiment of FIG. 1, the reference module 16 requires at least the current flying speed $V_{TAS}$ with respect to the air flowing around, the current barometric height H, the current overall mass m, values with respect to the load factors (at least in the lift axis, advantageously also in the longitudinal and transverse axes), an engine characteristic and also items of information with respect to the aircraft configuration. The engine characteristic may be for example the low-pressure shaft speed of the engines of the aircraft (for example as an averaged characteristic over all the engines). If the aircraft has two or more engines, it is conceivable that the low-pressure shaft speed is averaged over the engines.

With respect to the aircraft configuration, items of information that reflect the current aircraft configuration are transmitted. These are items of information with respect to the landing gear (retracted, extended) and also items of information with respect to lift-changing measures, such as for example high-lift systems, slats, landing flaps. These items of information are therefore advantageous because, by changing the aircraft configuration in such a way, the aerodynamics of the aircraft are influenced, and consequently the overall resistance of the aircraft is changed. In order to prevent that, when there is a change of the aircraft configuration, and consequently an accompanying change of the overall resistance, a variation of the flight performance caused by icing is not inferred, the individual possible aircraft configurations are also taken into account in the flight performance model, so that a correct nominal flight performance reference indicator can also be determined for each aircraft configuration.

For the determination of the nominal overall change in energy $\dot{E}_{ref}$, first a lift characteristic A is required, obtained according to the formula $$A = (n_z)^a \cdot g \cdot m$$

The load factor $(n_z)^a$ can in this case be calculated according to the formula)

$$(n_z)^a = -(n_x)^f \cdot \sin(\alpha) + (n_z)^f \cdot \cos(\alpha)$$

where the angle $\alpha$ is the angle of attack.

On the basis of the current aircraft configuration, the multidimensional table of the flight performance model 14 that matches the current aircraft configuration is then determined from the digital data memory. Then, on the basis of the values of the current flying altitude, the lift characteristic, the flying speed and also the engine characteristic from the table, the nominal overall change in energy $\dot{E}_{ref}$ over time is determined and temporarily stored in the reference module 16.

The nominal overall change in energy $\dot{E}_{ref}$ over time is in this case the characteristic of the flight performance of the aircraft in the un-iced state and can to this extent be understood as an idealized value. This reference indicator of the flight performance may in this case either be provided generally for the aircraft type of the aircraft or be adapted specifically to the aircraft, for example if the aircraft is already somewhat older, resulting in a changed flight performance. This allows the overall system to be much more accurate.

Furthermore, the evaluation unit 15 has a flying state module 17, which is likewise connected by the interface 11 to the data bus 12 and can then calculate on the basis of corresponding flying state parameters a current flight performance indicator in the form of an overall change in energy $\dot{E}_{ov}$. For this, the flying state module 17 receives as flying state parameters at least the current flying speed $V_{TAS}$, the current altitude H, the overall aircraft mass m and also a change over time of the overall aircraft mass $\dot{m}$.

On the basis of these values, it is then possible with the aid of the formula $$\dot{E}_{ov} \approx (g \cdot \dot{H} \cdot m) + (g \cdot H \cdot \dot{m}) + (V_{TAS} \cdot \dot{V}_{TAS} \cdot m) + (\tfrac{1}{2} \cdot V_{TAS}^2 \cdot \dot{m})$$

to determine the current overall change in energy over time as a flight performance characteristic.

In order to avoid atmospherically induced instances of false detection, a quasi steady state of the atmosphere is advantageously assumed. The change over time of the norm of the incoming-flow velocity vector $V_{TAS}$ may comprise not only a component from the change in the path speed (aircraft movement in the quasi steady-state, homogeneous wind field) but in addition a component from the experienced change over time of the wind (flying through a steady-state and/or inhomogeneous wind field), with $$\dot{V}_{TAS} = \dot{V}_{TAS, \vec{v}_K} + \dot{V}_{TAS, \vec{v}_w}$$

The component $\dot{V}_{TAS, \vec{v}_K}$ is dominated here decisively by the characteristics of the aircraft, and consequently correspondingly comprises the flight performance. By contrast, the change in the incoming flow due to a change of the wind $\dot{V}_{TAS, \vec{v}_w}$ results from the non-steady atmosphere through which the aircraft is moving. With the estimated component of the wind, in for example a geodetic system of coordinates (as advantageously explained below), these two components can be analytically separated. The following applies:

$$(\vec{V}_{TAS})_g = (\vec{V}_k)_g - (\vec{V}_w)_g$$

$$\Rightarrow (\dot{\vec{V}}_{TAS})_g = \frac{d}{dt}((\vec{V}_k)_g - (\vec{V}_w)_g)$$

The invention claimed is:

1. A method for detecting a degradation of flight performance of an aircraft in flight, comprising steps of:
   a) determining a current flying state of the aircraft in flight, from a plurality of values comprising flying state parameters that influence or characterize flight performance of the aircraft, which are at least partially recorded by sensors provided on the aircraft, calculating a current flight performance indicator from one or more flying state parameters of the currently determined flying state by an electronic evaluation unit,
   b) calculating, by an electronic evaluation unit, a current flight performance indicator the calculating being configured to calculate the current flight performance indicator as an overall change in energy over a predetermined period of time, based at least in part on one or more flying state parameters of the determined current flying,
   c) determining, by the electronic evaluation unit, a nominal flying performance reference indicator from a flight performance model of the aircraft in flight and one or more flying state parameters of the currently determined flying state, wherein the flight performance model of the aircraft in flight replicates a nominal flight performance of the aircraft in a non-degraded flying state, and wherein the flight performance model is provided to the electronic evaluation unit, and
   d) comparing, by the electronic evaluation unit, the current flight performance indicator and the nominal flight performance reference indicator and, if the comparing indicates a deviation between the current flight performance indicator and the nominal flight performance reference indicator that is greater than a predetermined limit value, detecting a degradation of flight performance of the aircraft in flight.

2. The method as claimed in claim 1, wherein the step of detecting the degradation of flight performance is configured to detect that the deviation establishes aircraft icing.

3. The method as claimed in claim 1 wherein the current flying state parameters are selected from the group consisting of a current flying speed, a change over time of the current flying speed, a current altitude, a change over time of the current flying altitude, a current overall aircraft mass, a change over time of the overall aircraft mass, an engine characteristic for determining engine performance or engine thrust, a load factor, a current lift characteristic of the aircraft, a current dynamic pressure, and a current aircraft configuration.

4. The method as claimed in claim 1 wherein the current lift A is calculated as the current lift characteristic of the aircraft as a flying state parameter according to the formula $$A=(n_z)^a \cdot g \cdot m$$

where A is the lift, $(n_z)^a$ is a load factor in the lift axis of the aircraft, g is the acceleration due to gravity and m is the overall aircraft mass.

5. The method as claimed in claim 4, wherein a load factor $(n_z)^a$ in a lift axis of the aircraft is calculated according to the formula $$(n_z)^a = -(n_x)^f \sin(\alpha) + (n_z)^f \cos(\alpha)$$

where $(n_x)^f$ is the load factor in the longitudinal axis of the aircraft, $(n_z)^f$ is the load factor in the vertical axis of the aircraft and $\alpha$ is the angle of attack.

6. The method as claimed in claim 1 further comprising:
   determining an engine characteristic, wherein the engine characteristic comprises a low-pressure shaft speed of at least one engine of the aircraft,
   wherein the engine characteristic is among the flying state parameters.

7. The method as claimed in claim 1, wherein calculating the current flight performance indicator includes calculating the overall change in energy according to the formula $$\dot{E}_{ov} = m \cdot V_{TAS} \cdot \dot{V}_{TAS} + \tfrac{1}{2} \cdot \dot{m} \cdot V_{TAS}^2 + m \cdot g \cdot \dot{H} + \dot{m} \cdot g \cdot H$$

where $(\dot{E}_{ov})$ is the overall change in energy over the predetermined time period, H is the current flying altitude, $(\dot{H})$ is the change over time of the flying altitudes over the predetermined time period, $V_{TAS}$ is the current flying speed with respect to the air flowing around, $\dot{V}_{TAS}$ is the change over time of the flying speed with respect to the air flowing around over the predetermined time period, m is the current overall aircraft mass, $(\dot{m})$ is the change over time of the overall aircraft mass over the predetermined time period and g is the acceleration due to gravity.

8. The method as claimed in claim 1 wherein the nominal flight performance reference indicator is a nominal overall change in energy over a predetermined time period, a flight performance model being provided, from which the nominal overall change in energy for the current flying state is derivable on the basis of the current flying state.

9. The method as claimed in claim 8, further comprising calculating a differential resistance coefficient $\Delta C_W$ based on a current overall change in energy as a current flight performance indicator and a nominal overall change in energy as a nominal flight performance reference indicator according to the formula $$\Delta C_W = \frac{\dot{E}_{ref} - \dot{E}_{ov}}{q \cdot S \cdot V_{TAS}}$$

where $(\dot{E}_{ov})$ is detected as the current overall change in energy, $(\dot{E}_{ref})$ as the nominal overall change in energy, $V_{TAS}$ as the speed of the aircraft with respect to the air, q as the dynamic pressure and S as the reference surface area of the aircraft, and
   detecting a degradation of the flight performance if the differential resistance coefficient $\Delta C_W$ is greater than the limit value.

10. The method as claimed in claim 1 wherein the current flight performance indicator is determined while also taking into account a variation in wind experienced by the aircraft.

11. The method as claimed in claim 10, wherein a wind component of a change over time of the speed of the aircraft with respect to the air while taking into account the variation in wind experienced according to the formula $$\dot{V}_{TAS,\vec{V}_k} = \frac{\dot{u}_{k,g} u_{a,g} + \dot{v}_{k,g} v_{a,g} + \dot{w}_{k,g} w_{a,g}}{V_{TAS}}$$

where $\dot{u}_{k,g}, \dot{v}_{k,g}, \dot{w}_{k,g}$ are the three components of the path acceleration vector (time derivative of the path speeds) in the geodetic system of coordinates, $u_{a,g}, v_{a,g}, w_{a,g}$ are the three components of the vector of the current flying speed with respect to the air, $V_{TAS}$ is the speed of the aircraft with respect to the air and $\dot{V}_{TAS,\vec{V}_K}$ is the change in the current flying speed because of a change in the path speed, and the current flight performance indicator is given as an overall change in energy over a predetermined time period and is calculated according to the formula $$\dot{E}_{ov} = m \cdot V_{TAS} \cdot \dot{V}_{TAS} + \frac{1}{2} \cdot \dot{m} \cdot V_{TAS}^2 + m \cdot g \cdot \dot{H} + \dot{m} \cdot g \cdot H$$

where $\dot{V}_{TAS} = \dot{V}_{TAS, \vec{V}_K}$.

12. The method as claimed in claim 1 wherein values of flying state parameters for determining a sideslip state are determined, a compensation value of the current flight performance indicator is calculated in dependence on these determined values of flying state parameters for determining the sideslip state and the comparison is carried out in dependence on the compensation value.

13. The method as claimed in claim 12, wherein the compensation value is a resistance compensation value, which is calculated according to the formula $$\Delta C_{W\beta,Comp} \equiv \frac{n_y \cdot m \cdot g \cdot \sin \hat{\beta}}{q \cdot S_F}$$

where $\Delta C_{W,comp}$ is the resistance compensation value, $n_y$ is a lateral load factor, m is the overall aircraft mass, g is the acceleration due to gravity, β is the sideslip angle, q is the dynamic pressure and SF is the reference surface area of the aircraft.

14. The method as claimed in claim 1 wherein a reduced flight performance model is provided to the electronic evaluation unit in the form of a multidimensional table, each flying state parameter that is relevant to the flight performance model being replicated by a dimension of the table, each dimension of the table having a plurality of interpolation points, which are the predetermined values of the respective flying state parameters, and at least one nominal flight performance reference indicator being stored for each pair of interpolation values comprising values of the various flying state parameters.

15. The method as claimed in claim 14, wherein the flying state parameters forming the dimensions of the table include any among and/or any combination or sub-combination of flying speed with respect to the air flowing around, a lift characteristic of lift of the aircraft, an engine characteristic of engine performance, flying altitude, and an aircraft configuration.

16. An assistance system for detecting a degradation of flight performance of an aircraft in flight, the assistance system being configured for performing the method for detecting the degradation in flight performance as claimed in claim 1.

17. The assistance system as claimed in claim 16, wherein the assistance system is configured for performing a detecting of aircraft icing based on a recognized degradation of flight performance.

18. An aircraft comprising an assistance system as claimed in claim 16.

* * * * *